United States Patent
Chen et al.

(10) Patent No.: US 7,754,634 B2
(45) Date of Patent: Jul. 13, 2010

(54) LOW-LOSS MICROWAVE DIELECTRIC CERAMIC

(75) Inventors: Xiangming Chen, Hangzhou (CN); Xiecheng Fan, Hangzhou (CN)

(73) Assignee: Zhejiang University, Xihu District, Hangzhou, Zhejiang Province (CN)

( * ) Notice: Subject to any disclaimer, the term of this patent is extended or adjusted under 35 U.S.C. 154(b) by 155 days.

(21) Appl. No.: 12/186,479

(22) Filed: Aug. 5, 2008

(65) Prior Publication Data

US 2009/0270244 A1    Oct. 29, 2009

(30) Foreign Application Priority Data

Apr. 25, 2008   (CN) .................... 2008 1 0061046

(51) Int. Cl.
*C04B 35/465* (2006.01)
(52) U.S. Cl. ...................... 501/135; 501/136
(58) Field of Classification Search ................. 501/135, 501/136
See application file for complete search history.

(56) References Cited

U.S. PATENT DOCUMENTS

| | | | | |
|---|---|---|---|---|
| 5,356,844 | A * | 10/1994 | Hirahara et al. ............. | 501/136 |
| 6,503,861 | B1 * | 1/2003 | Murakawa et al. .......... | 501/137 |
| 6,613,707 | B2 * | 9/2003 | Choi et al. ................... | 501/136 |
| 6,656,864 | B2 * | 12/2003 | Okawa ........................ | 501/136 |
| 6,881,694 | B2 * | 4/2005 | Mizui et al. ................. | 501/136 |
| 2004/0029710 | A1 * | 2/2004 | Mizui et al. ................. | 501/136 |

FOREIGN PATENT DOCUMENTS

| | | | |
|---|---|---|---|
| CN | 1772697 | * | 5/2006 |
| JP | 11322417 | * | 11/1999 |

\* cited by examiner

*Primary Examiner*—Karl E Group
(74) *Attorney, Agent, or Firm*—Global IP Services; Tianhua Gu

(57) ABSTRACT

There is provided a low-loss microwave dielectric ceramic having a composition represented by $xCaO \cdot yLn_2O_3 \cdot zAl_2O_3 \cdot mTiO_2$ wherein Ln is Nd or Sm, 25.0 mole % $\leq x \leq$ 75.0 mole %, 10.0 mole % $\leq y \leq$ 30.0 mole %, 10.0 mole % $\leq z \leq$ 30.0 mole %, 0.8 mole % $\leq m \leq$ 20.0 mole %, $x+y+z+m=100$ mole %. It has a dielectric constant in the range from 18 to 25, an extremely large Qf value ranging from 80,000 to 200,000 GHz, and a temperature coefficient of resonant frequency tunable in the vicinity of 0. It can make the applications of dielectric resonators, filters, and antennas extended to higher frequency and larger power; it can also be applied to microwave capacitors, temperature-compensated capacitors, microwave substrates, et al.

3 Claims, No Drawings

LOW-LOSS MICROWAVE DIELECTRIC CERAMIC

CROSS REFERENCE TO RELATED PATENT APPLICATION

This patent application claims the priority of the Chinese patent application No. 200810061046.9 with a filing date of Apr. 25, 2008, which application is incorporated herein by reference.

FIELD OF THE INVENTION

The present invention relates to a low-loss microwave dielectric ceramic, especially the one utilizable to fabricate key components in microwave communication systems, such as microwave dielectric resonators, filters, antennas, et al.

BACKGROUND OF THE INVENTION

Recently, with the rapid development of microwave communication technologies such as mobile communication and satellite communication technologies, there is an increasing demand for microwave dielectric ceramics which are widely utilized in dielectric resonators, dielectric filters, dielectric antennas, and any of various microwave electronic components. The rapid developing trend that higher frequencies are utilized in microwave communication sets higher requirements for low-loss microwave dielectric ceramics, wherein three principle characteristics are: dielectric constant $\epsilon$<30, in order to be suitable for applications at higher frequencies; quality factor Qf>60,000 GHz, to obtain better frequency selectivity; temperature coefficient of resonant frequency $\tau_f$=0±10 ppm/°C., to ensure the stability of components when the operating temperature fluctuates.

On the other hand, exemplary low-loss microwave dielectric ceramics hitherto known are $Ba(Mg_{1/3}Ta_{2/3})O_3$, $CaTiO_3$—$MgTiO_3$, et al. The former have some shortcomings such as high sintering temperature, long-time heat treatment, high sensitivity of the quality factor and temperature coefficient of resonant frequency to the processing conditions, whereas the latter has the disadvantage of a relatively low Qf value. Besides, the former costs too high due to the noble constituent element, Ta.

Therefore, there is an urgent need to develop a microwave dielectric ceramic which has combined merits of easy-preparing, low-cost, and high performance to satisfied relevant application requirements.

SUMMARY OF THE INVENTION

The object of the present invention is to provide a microwave dielectric ceramic which has dielectric constant ranging from 18 to 25, low dielectric loss (Qf=80,000~200,000 GHz) and good temperature stability.

In order to achieve the above object, there is provided a low-loss microwave dielectric ceramic which consists essentially of a composition represented by $xCaO.yLn_2O_3.zAl_2O_3.mTiO_2$, wherein Ln is selected from a group consisting of Nd and Sm, and the following relations are satisfied: 25.0 mole %≦x≦75.0 mole %, 10.0 mole %≦y≦30.0 mole %, 10.0 mole %≦z≦30.0 mole %, 0.8 mole %≦m≦20.0 mole %, x+y+z+m=100 mole %.

Additional advantages and other features of the present invention will become more readily apparent to those of ordinary skill in the art after reviewing the following detailed description.

DETAILED DESCRIPTION OF THE INVENTION

The following description contains specific information pertaining to the implementation of the present invention.

The present invention provides a microwave dielectric ceramic which consists essentially of a composition represented by $xCaO.yLn_2O_3.zAl_2O_3.mTiO_2$, wherein Ln is selected from a group consisting of Nd and Sm, and the following relations are satisfied: 25.0 mole %≦x≦75.0 mole %, 10.0 mole %≦y≦30.0 mole %, 10.0 mole %≦z≦30.0 mole %, 0.8 mole %≦m≦20.0 mole %, x+y+z+m=100 mole %.

The composition mentioned above is the effective composition of the microwave dielectric ceramic. Generally, the microwave dielectric ceramic further includes the organic binder and trace amount of impurities contained in raw materials or generated in processing procedures, which don't materially affect the characteristics of the invention.

Preferred microwave dielectric ceramics consist essentially of a composition represented by $xCaO.yLn_2O_3.zAl_2O_3.mTiO_2$, wherein x, y, z and m satisfy the following relations: 45.0 mol %≦x≦60.0 mol %, 15.0 mol %≦y≦25.0 mol %, 15.0 mol %≦z≦25.0 mol %, 4.0 mol %≦m≦20.0 mol %, x+y+z+m=100 mol %.

Further, the optimum microwave dielectric ceramic consists essentially of a composition represented by $xCaO.yLn_2O_3.zAl_2O_3.mTiO_2$, wherein Ln is Sm, x=54.55 mol %, y=18.18 mol %, z=18.18 mol %, and m=9.09 mol %. The optimum microwave dielectric ceramic has the optimum microwave dielectric properties: dielectric constant=21.5, quality factor Qf=200,000 GHz, temperature coefficient of resonant frequency f=+3 ppm/°C.

In addition, the microwave dielectric ceramic according to the present invention may be prepared with routine methods in the art. A detailed preparation method is described as follows: $CaCO_3$, $Nd_2O_3$ or $Sm_2O_3$, $Al_2O_3$ and $TiO_2$ are weighed according to the mole percentage of CaO, $Nd_2O_3$ or $Sm_2O_3$, $Al_2O_3$, and $TiO_2$ in the composition formula, and blended by ball milling with zirconia media in distilled water for 18 to 28 h. The mixtures are calcined at 1150~1250° C. in air for 2 to 5 h after drying. The calcined powder is mixed with organic binder and pelletized, then sieved and molded into the shape of a disc. These discs are sintered in air at 1400~1500° C. for 2 to 5 h to obtain the low-loss microwave ceramic. The organic binder is selected from what are generally utilized by those of skill in the art. Exemplary organic binders include, but are not limited to, water-soluble polymers such as polyvinyl alcohol (PVA), etc.

The present invention is further described by means of examples given below but not in any limitative sense.

EXAMPLES 1~16

First, highly pure (≧99.9%) $CaCO_3$, $Nd_2O_3$ or $Sm_2O_3$, $Al_2O_3$ and $TiO_2$ were weighed according to the mole percentage of CaO, $Ln_2O_3$, $Al_2O_3$, and $TiO_2$ as indicated in TABLE 1, and then blended by ball milling with zirconia media in distilled water for 24 h. The mixtures were calcined at 1150~1250° C. in air for 3 h after drying. The calcined powder was mixed with 6 wt % aqueous polyvinyl alcohol solution (the concentration of 5 wt %, the PVA with the degree of polymerization of 1750) and pelletized, then sieved and molded into the shape of a disc of 12 mm in diameter, 4~6 mm in thickness with a uniaxial pressure of 1000 kg/cm². These discs were sintered in air at 1400~1500 C. for 3 h to obtain the low loss microwave ceramic.

The phase constituents were determined by the powder X-ray diffraction method, and the microwave dielectric properties were evaluated by the Hakki-Coleman method and the resonant cavity method at 10 GHz.

For the samples of Examples, the relationship between microwave dielectric properties and the composition are given in TABLE 1.

TABLE 1

| | Ingredient | | | | | Microwave Properties | |
|---|---|---|---|---|---|---|---|
| No. | CaO (mole %) | $Nd_2O_3$ (mole %) | $Sm_2O_3$ (mole %) | $Al_2O_3$ (mole %) | $TiO_2$ (mole %) | | Qf (GHz) | $f$(ppm/° C.) |
| 1 | 48.85 | 0 | 22.075 | 22.075 | 7.00 | 18.0 | 86500 | −8 |
| 2 | 51.64 | 0 | 20.68 | 20.68 | 7.00 | 18.5 | 107650 | −7.5 |
| 3 | 50.49 | 0 | 24.26 | 24.26 | 0.99 | 18.7 | 130570 | −6 |
| 4 | 52.38 | 0 | 21.43 | 21.43 | 4.76 | 19.7 | 160800 | −3 |
| 5 | 53.48 | 0 | 19.77 | 19.77 | 6.98 | 20.2 | 178000 | 0 |
| 6 | 54.55 | 0 | 18.18 | 18.18 | 9.09 | 21.5 | 200000 | 3 |
| 7 | 58.33 | 0 | 12.50 | 12.50 | 16.67 | 22.9 | 151000 | 7 |
| 8 | 60.00 | 0 | 10.00 | 10.00 | 20.00 | 24.5 | 95200 | 10 |
| 9 | 50.49 | 24.26 | 0 | 24.26 | 0.99 | 18.8 | 152170 | −5 |
| 10 | 52.38 | 21.43 | 0 | 21.43 | 4.76 | 19.8 | 171200 | −3 |
| 11 | 53.48 | 19.77 | 0 | 19.77 | 6.98 | 20.5 | 198000 | 2 |
| 12 | 54.55 | 18.18 | 0 | 18.18 | 9.09 | 21.9 | 165000 | 5 |
| 13 | 58.33 | 12.50 | 0 | 12.50 | 16.67 | 23.0 | 108500 | 8 |
| 14 | 60.00 | 10.00 | 0 | 10.00 | 20.00 | 25.0 | 84300 | 10 |
| 15 | 56.29 | 18.355 | 0 | 18.355 | 7.00 | 22.1 | 128700 | 7.5 |
| 16 | 58.62 | 17.19 | 0 | 17.19 | 7.00 | 22.6 | 117000 | 9 |

As seen from TABLE 1, in the present invention, with increasing contents of CaO and $TiO_2$, and decreasing contents of $Ln_2O_3$ (Ln=Nd or Sm) and $Al_2O_3$, the dielectric constant tends to increase, f value varies from negative to positive, whereas Qf value first increases, then decreases, and peaks when the content of $TiO_2$ is 9.09 mole %.

It is confirmed by experiments that if x<25.0 mol % or x>75.0 mol %, y<10.0 mol % or y>30.0 mol %, z<10.0 mol % or z>30.0 mol %, m<0.8 mol % or m>20 mol %, Qf value becomes smaller than 80,000 GHz, or the temperature coefficient of resonant frequency is too large (|f|>+10 ppm/° C.).

Among the compositions of Examples 1~16, the composition wherein CaO=54.55 mol %, $Sm_2O_3$=18.18 mol %, $Al_2O_3$=18.18 mol %, and $TiO_2$=9.09 mol % has the best microwave dielectric properties: =21.5, Qf=200,000 GHz, f=+3 ppm/° C.

The present invention provides a low-loss temperature-stable dielectric ceramic with a dielectric constant ranging from 18 to 25. It can make the applications of dielectric resonators, filters, and antennas extended to higher frequency and larger power; it can also be applied to microwave capacitors, temperature-compensated capacitors, microwave substrates, et al. Therefore, the present invention has a large industrial application value.

While the present invention has been described with specific reference to certain embodiments, a person of ordinary skill in the art would appreciate that changes can be made in form and detail without departing from the spirit and the scope of the invention. Thus, the present embodiments are to be considered as illustrative and not restrictive, and the present invention is not to be limited to the details given herein, but may be modified within the scope.

What is claimed is:

1. A low-loss microwave dielectric ceramic consisting essentially of a composition represented by $xCaO.yLn_2O_3.zAl_2O_3.mTiO_2$, wherein Ln is selected from a group consisting of Nd and Sm, and the following relations are satisfied: 25.0 mole %≦x≦75.0 mole %, 10.0 mole %≦y≦30.0 mole %, 10.0 mole %≦z≦30.0 mole %, 0.8 mole %≦m≦20.0 mole %, x+y+z+m=100 mole %.

2. The low-loss microwave dielectric ceramic according to claim 1, wherein x, y, z and m satisfy the following relations: 45.0 mole %≦x≦60.0 mole %, 15.0 mole %≦y≦25.0 mole %, 15.0 mole %≦z≦25.0 mole %, 4.0 mole %≦m≦20.0 mole %, x+y+z+m=100 mole %.

3. The low-loss microwave dielectric ceramic according to claim 2, wherein Ln is Sm, x=54.55 mole %, y=18.18 mole %, z=18.18 mole %, and m=9.09 mole %.

* * * * *